United States Patent
Holmgren et al.

(10) Patent No.: US 8,944,004 B2
(45) Date of Patent: Feb. 3, 2015

(54) DETECTION ARRANGEMENT AND METHOD

(75) Inventors: Hans Holmgren, Stockholm (SE); Thomas Axelsson, Farsta (SE)

(73) Assignee: Delaval Holding AB, Tumba (SE)

( * ) Notice: Subject to any disclaimer, the term of this patent is extended or adjusted under 35 U.S.C. 154(b) by 395 days.

(21) Appl. No.: 13/141,189

(22) PCT Filed: Dec. 10, 2009

(86) PCT No.: PCT/EP2009/066849
§ 371 (c)(1),
(2), (4) Date: Jun. 21, 2011

(87) PCT Pub. No.: WO2010/072580
PCT Pub. Date: Jul. 1, 2010

(65) Prior Publication Data
US 2011/0253051 A1 Oct. 20, 2011

(30) Foreign Application Priority Data
Dec. 22, 2008 (SE) ....................................... 0850170

(51) Int. Cl.
*A01J 3/00* (2006.01)
*A01J 5/00* (2006.01)
*A01J 7/04* (2006.01)
*A01J 5/017* (2006.01)

(52) U.S. Cl.
CPC . *A01J 7/04* (2013.01); *A01J 5/0175* (2013.01)
USPC ...................................... 119/14.08

(58) Field of Classification Search
CPC .................. A01J 7/04; A01J 5/0175
USPC ............ 119/14.5, 14.02, 14.08, 14.14, 14.15, 119/14.17
See application file for complete search history.

(56) References Cited

U.S. PATENT DOCUMENTS 5,762,020 A    6/1998    Van der Lely

FOREIGN PATENT DOCUMENTS

| EP | 0 360 354 A1 | 3/1990 |
| EP | 0 468 588 A1 | 1/1992 |
| EP | 0 728 412 | 8/1996 |
| EP | 0 768 026 A2 | 4/1997 |

(Continued)

OTHER PUBLICATIONS

Examination Report in counterpart New Zealand Application No. 592621 mailed Sep. 13, 2012 (2 pages).

(Continued)

*Primary Examiner* — Rob Swiatek
*Assistant Examiner* — Kathryn L Thompson
(74) *Attorney, Agent, or Firm* — Finnegan, Henderson, Farabow, Garrett & Dunner, L.L.P.

(57) ABSTRACT

A detecting arrangement is provided for a teat cleaning device including a teat cleaning cup in which teats of milking animals are contained during cleaning thereof. The detecting arrangement comprises a measuring device provided for automatically measuring a teat related parameter in or adjacent to the teat cleaning cup at completion of a teat cleaning process, and a processing device operatively connected to the measuring device and provided for automatically comparing the measured teat related parameter with a reference value and for automatically determining whether the teat of the milking animal has been contained in the teat cleaning cup unfolded during the teat cleaning process based on the comparison.

24 Claims, 3 Drawing Sheets

(56) References Cited

FOREIGN PATENT DOCUMENTS

| | | |
|---|---|---|
| EP | 1 520 468 A1 | 4/2005 |
| EP | 1 933 168 A1 | 6/2008 |
| NZ | 328448 | 5/1998 |
| RU | 2212788 C2 | 9/2003 |
| SU | 1377083 A1 | 2/1988 |
| SU | 1435216 A1 | 11/1988 |
| WO | WO 97/15183 A1 | 5/1997 |
| WO | WO 98/11773 A1 | 3/1998 |
| WO | WO 98/45808 | 10/1998 |
| WO | WO 2007/043036 A1 | 4/2007 |
| WO | WO 2007/104124 A1 | 9/2007 |
| WO | WO 2007/146280 A2 | 12/2007 |
| WO | WO 2008/030086 A1 | 3/2008 |
| WO | WO 2008/140407 | 11/2008 |

OTHER PUBLICATIONS

International-Type Search Report of Swedish Application 0850170-2, including English translation, dated Aug. 11, 2009 (18 pages).

DETECTION ARRANGEMENT AND METHOD

PRIORITY APPLICATIONS

This is a U.S. National Stage Application under 35 U.S.C. §371 based on International Application No. PCT/EP2009/066849, filed Dec. 10, 2009, which claims the benefit of priority to Application No. SE 0850170-2, filed Dec. 22, 2008 in Sweden. Both of these applications are incorporated herein by reference in their entirety.

TECHNICAL FIELD OF THE INVENTION

The present invention relates generally to dairy farming, and more specifically the invention relates to detection arrangements, computer program products, and detection methods for a teat cleaning device.

DESCRIPTION OF RELATED ART

In the automated milk production of today there are arrangements and methods available that automatically measure various parameters which indicate the yield and quality of the milk produced. Other parameters are measured and used to trigger the initiation of automatically performed actions.

Several of these actions are related to the hygiene and cleanliness at the dairy farm in order to fulfil requirements determined by authorities and associations and to secure animal welfare and high quality in the milk production.

One of these actions refers to the cleaning of the teats of the animals prior to milking in order to remove dirt and soil on the teats and to prevent infections such as mastitis to spread among a herd. One automated teat cleaning device used for this purpose is the one which includes a teat cleaning cup, in which teats of milking animals are contained during cleaning thereof.

SUMMARY OF THE INVENTION

Sometimes, however, a teat of a milking animal is not properly cleaned by such automated teat cleaning device, and as a result an infection such as mastitis may spread from the milking animal to another milking animal. Further, the quality of the milk will be deteriorated.

An object of the present invention is thus to provide an arrangement, a computer program product, and a method, respectively, for a teat cleaning device of the above kind, by which the above disclosed problems can be avoided.

A further object of the invention is to provide such arrangement, computer program product, and method, which are robust, effective, fast, precise, accurate, reliable, safe, easy to use, and of reasonable cost.

These objects are according to the present invention attained by arrangements, computer program products, and methods as claimed in the appended patent claims.

According to a first aspect of the invention, a detection arrangement is provided comprising a measuring device for automatically measuring a teat related parameter in or adjacent to a teat cleaning cup during or before removal of the teat cleaning cup from the teat at completion of a teat cleaning process. A processing device is operatively connected to the measuring device and arranged for automatically comparing the measured teat related parameter with a reference value and for automatically determining whether the teat of the milking animal has been contained in the teat cleaning cup in an unfolded manner during the teat cleaning process based on the comparison.

By the present invention the teat cleaning process can be monitored and can be repeated if it is determined that a teat has not been contained in the teat cleaning cup in an unfolded manner during the teat cleaning process, i.e., has not been cleaned properly. This is of outermost importance in order to guarantee cleanliness, to fulfill hygiene requirements, and to secure the milk quality.

Preferably, the teat related parameter is a parameter related to the presence of a teat of a milking animal in or above the teat cleaning cup or to the position of the teat in relation to the teat cleaning cup.

In one embodiment the measuring arrangement comprises a vision system, preferably a vision system provided for three-dimensional vision such as a vision system using laser triangulation or a stereo vision system, optionally equipped with a light source and speckle generating arrangement for creating light having a speckle pattern, or a vision system, preferably a time of flight camera or an active wavefront sampling camera, which has a two-dimensional array of pixels and which is capable of providing, for each of the pixels, a distance between the camera and the object point imaged.

The vision system is preferably mounted on a robot arm provided for collecting the teat cleaning cup, for holding the teat cleaning cup during the cleaning process, and for removing the teat cleaning cup upon completion of the teat cleaning process.

Advantageously, the vision system is provided for recording at least one image of an area, which includes an upper end of the teat cleaning cup in a lower portion thereof, during removal of the teat cleaning cup, and an image processor provided for deducing the teat related parameter from the image.

The teat related parameter may be a position of the teat in a plane essentially orthogonal to a direction of the removal of the teat cleaning cup. Typically the plane is a horizontal plane and the removal of the teat cleaning cup is performed vertically downwards. The position is an absolute position in some coordinate system or is a position relative the position of the teat cleaning cup in the above disclosed plane.

By this embodiment the same vision system may be used for the detection whether a teat of a milking animal has been cleaned or not in a teat cleaning process and for other purposes such as e.g. detecting the position of a teat for attachment of a teat cup or a teat cleaning cup.

In another embodiment the measuring arrangement comprises a source of waves provided for transmitting waves, advantageously microwaves, towards an area within or immediately above the teat cleaning cup, and a sensor provided for detecting waves from the source of waves. Preferably, the source of waves and the sensor are mounted in the walls of the teat cleaning cup at opposite sides so that the measured teat related parameter will be an absorption by a teat at a position between the source of waves and the sensor.

By this embodiment a very simple and robust detection arrangement is obtained, which is accurate and reliable.

According to a second aspect of the invention, a computer program product is provided. The computer program product is loadable into the internal memory of a computer and comprises software code portions for carrying out the following steps when the computer program product is run on the computer: automatically providing a teat related parameter measured in or adjacent to the teat cleaning cup during or before removal of the teat cleaning cup from the teat at completion of a teat cleaning process, automatically comparing the measured teat related parameter with a reference value, and automatically determining whether the teat of the milking animal has been contained in the teat cleaning cup unfolded during the teat cleaning process based on the comparison.

According to a third aspect of the invention, a detection method is provided comprising the steps disclosed above.

The invention is capable of being implemented in virtually any kind of milking system having a teat cleaning device of the above disclosed kind.

Further characteristics of the invention, and advantages thereof, will be evident from the following detailed description of preferred embodiments of the present invention given hereinafter and the accompanying FIGS. 1-6, which are given by way of illustration only, and are thus not limitative of the present invention.

DETAILED DESCRIPTION OF EMBODIMENTS

Figure 1:
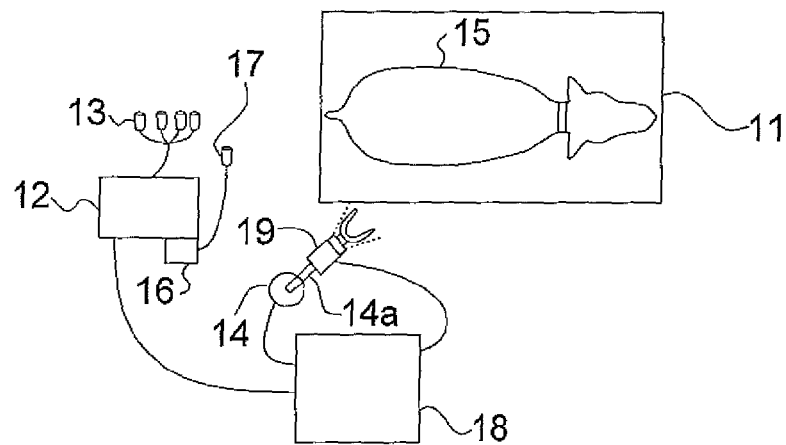
FIG. 1 illustrates schematically a milking system, in which a detecting arrangement according to an embodiment of the invention is implemented.

FIG. 1 illustrates schematically a milking system, in which a detecting arrangement according to an embodiment of the invention is implemented. The milking system comprises a milking stall 11 and a milking machine 12 with teat cups 13. A robot 14 equipped with a robot arm 14a is provided for automatically attaching the teat cups 13 to the teats of a milking animal 15 prior to milking. A teat cleaning device 16 including a teat cleaning cup 17 may be provided for cleaning the teats of the milking animal 15 prior to the attachment of the teat cups 13 to the teats of the milking animal 15. The teat cleaning cup 17 may be automatically attached to or positioned to contain the teats of the milking animal 15 e.g. in a sequential order by the robot 14. Typically, cleaning fluid, air, and/or water is supplied to the teat of the milking animal 15 in a teat cleaning process while the teat is contained within the teat cleaning cup 17, wherein the teat cleaning cup is held by the robot arm 14a.

A processing and control device 18 is provided for processing and controlling of the milking system, and comprises typically a microcomputer, suitable software, and a database of the milking animals served by the milking system. Such database includes typically information of the milking animals, such as e.g. when the milking animals were milked last time, their milk production, their milk quality, etc. In particular the processing and control device 18 is operatively connected to the milking machine 12, to the robot 14, and to the teat cleaning device 16 to control the operations thereof.

In order to detect the teats of the milking animal 15 and to determine the positions thereof automatically to provide information so as to enable the processing and control device 18 to control the robot 14 to automatically attach the teat cleaning cup 17 and the teat cups 13 to the teats of the milking animal 15, a visual teat sensing device 19 is arranged on the robot arm 14a and is operatively connected to the processing and control device 18 in order to deliver image data thereto.

The visual teat sensing device 19 is, in accordance with the invention, also provided for automatically measuring a teat related parameter in or adjacent to the teat cleaning cup 17 during or before removal of the teat cleaning cup 17 from the teat at completion of a teat cleaning process. The measured teat related parameter is forwarded to the processing and control device 18, which, in turn, is provided for automatically comparing the measured teat related parameter with a reference value and for automatically determining whether a teat of a milking animal 15 has been contained in the teat cleaning cup 17 in an unfolded manner during the teat cleaning process based on the comparison. Hereby, it can be determined whether the teat of the milking animal 15 has been cleaned properly.

Figure 2:
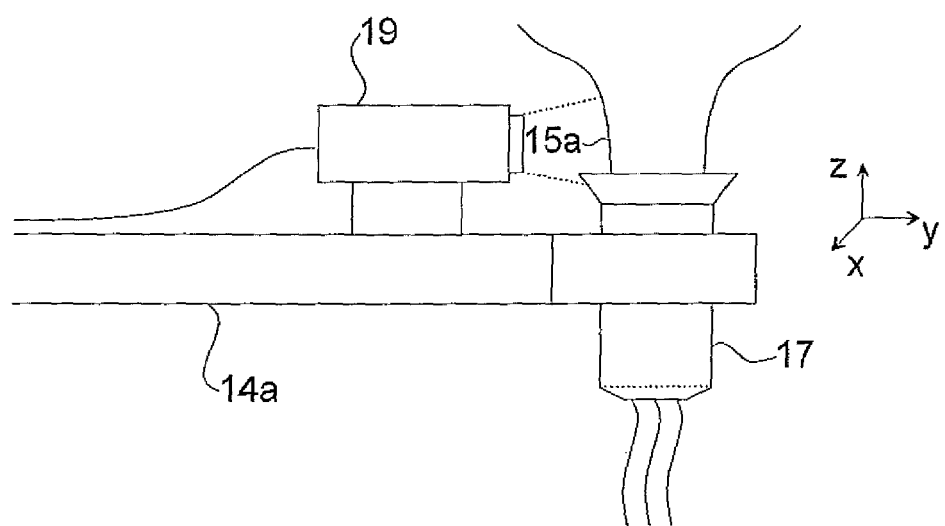
FIG. 2 illustrates schematically the detecting arrangement of FIG. 1 in greater detail.
Figure 3:
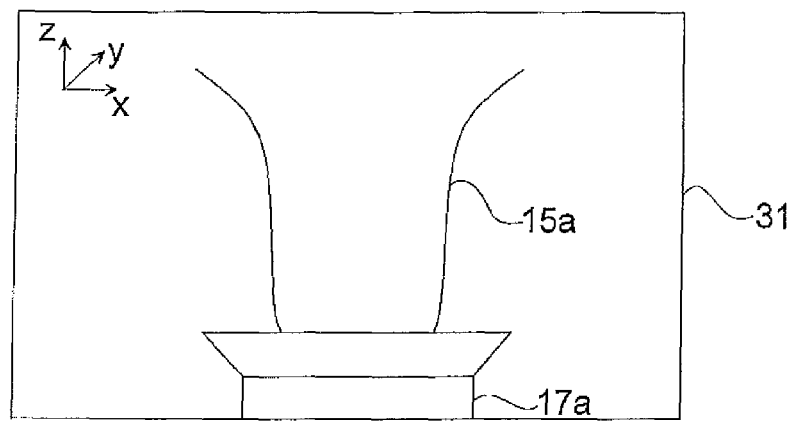
FIG. 3 illustrates schematically an exemplary image recorded by the detecting arrangement of FIG. 1.

FIG. 2 illustrates schematically the detecting arrangement of FIG. 1 in greater detail. The visual teat sensing device 19 is provided for recording at least one image of an area, which includes an upper end 17a of the teat cleaning cup 17 in a lower portion thereof, during removal of the teat cleaning cup 17. FIG. 3 illustrates an example of such an image 31.

Further, an image processor is arranged to deduce the teat related parameter from the image. The image processor may be integrated into the visual teat sensing device 19, or may be integrated into the processing and control device 18, or may be a separate stand-alone unit.

The removal of the teat cleaning cup 17 from the teat 15a is typically performed by lowering the teat cleaning cup 17, which is performed by the robot arm 14a, preferably relatively slowly while the teat 15a is dried and/or wiped.

The teat related parameter is preferably a position of the teat in the horizontal xy plane, which is essentially orthogonal to the direction z of the removal of the teat cleaning cup 17. In particular, the position may be a position relative the position of the teat cleaning cup 17 in the xy plane.

To this end the visual teat sensing device 19 may be provided for three-dimensional vision such as a vision system using laser triangulation or a stereo vision system, optionally equipped with a light source and speckle generating arrangement for creating light having a speckle pattern. Alternatively, the visual teat sensing device 19 is a time of flight camera or an active wavefront sampling camera, which has a two-dimensional array of pixels and which is capable of providing, for each of the pixels, a distance between the camera and the object point imaged.

Hereby, the visual teat sensing device 19 is capable of determining the position of the teat 15a not only in the x direction but also in the y direction, that is, in the direction along the optical axis of the visual teat sensing device 19. By means of determining the position of the teat 15a in the xy plane and comparing this position with the position of the teat cleaning cup 17 in the horizontal xy plane (which is simultaneously imaged by the visual teat sensing device 19) it can be determined whether the teat 15a has been contained appropriately in the teat cleaning cup 17 or not, i.e. not folded, which in turn indicates whether the teat 15a has been cleaned or not in the teat cleaning process prior to removal of the teat cleaning cup 17.

That is, if the teat 15a has been contained in the teat cleaning cup 17 in an unfolded manner, it is determined that the teat 15a has been cleaned in the teat cleaning process prior to removal of the teat cleaning cup 17. If the teat 15a has been contained inappropriately in the teat cleaning cup 17, e.g. folded, it is determined that the teat 15a has not been cleaned, or has been cleaned incompletely or inappropriately, in the teat cleaning process prior to removal of the teat cleaning cup 17. Finally, if the teat 15*a* has not been contained in the teat cleaning cup 17, it is determined that the teat 15*a* has not been cleaned in the teat cleaning process prior to removal of the teat cleaning cup 17.

The above detecting approach may be repeated while the teat cleaning cup 17 is removed in order to secure safe detection of the teat 15*a* and avoid any false teat detections. In particular, images may be recorded at two different stages of the removal of the teat cleaning cup 17, selected to distinguish a teat from a sucked in other part of the udder.

The identification of the teat in the image(s) may be based upon the shape, e.g. the outer contour, of the teat 15*a*, e.g. as determined in a previous detection of the teat 15*a*.

If it is determined that the teat has not been cleaned in the teat cleaning process (or has been cleaned incompletely or inappropriately), this may trigger the processing and control device 18 to automatically search for the teat, position the teat cleaning cup 17 properly, and repeat the teat cleaning process fully automatically.

It shall be appreciated that the processing and control device 18 may also use other parameters in the determination whether the teat of the milking animal has been cleaned or not in the teat cleaning process.

For instance, the processing and control device 18 may perform the determination based on a force required by the robot 14 for the removal of the teat cleaning cup 17 or on one or several forces in the robot arm 14*a*, e.g. measured as one or several pressures if the robot 14 is a hydraulic or pneumatic robot, during the removal of the teat cleaning cup 17.

Further, the processing and control device 18 may perform the determination based on one or several vacuum levels as measured in the teat cleaning cup 17.

To this end, several pressure sensors (not illustrated) may be provided in the robot arm 14*a* and/or in the teat cleaning cup 17 and be operatively connected to the processing and control device 18.

Figure 4:
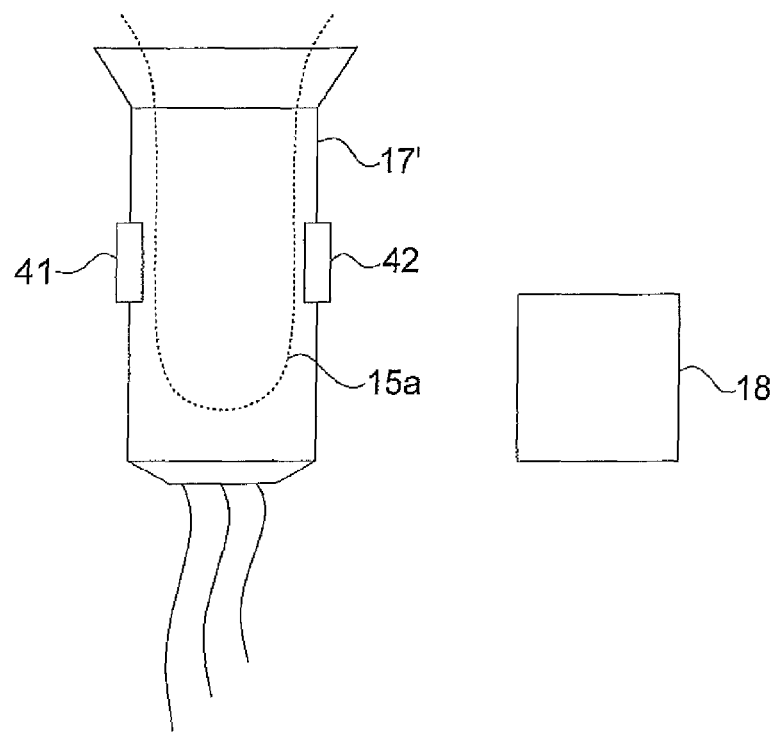
FIG. 4 illustrates schematically a detecting arrangement according to a further embodiment of the invention.

FIG. 4 illustrates schematically a detecting arrangement according to a further embodiment of the invention. The arrangement comprises a source of waves 41 provided for transmitting waves, preferably microwaves, towards an area within the teat cleaning cup 17' and a sensor 42 provided for detecting waves from the source of waves 41. The source of waves 41 and the sensor 42 are mounted in the walls of the teat cleaning cup 17' preferably at opposite sides in order to detect the transmission of the waves through the interior of the teat cleaning cup 17' at completion of a teat cleaning process. The measured teat related parameter is thus an absorption by the teat 15*a* at a position between the source of waves 41 and the sensor 42.

The arrangement includes further a processing and control device 18 of FIG. 1, operatively connected via wire or wirelessly to the source of waves 41 and the sensor 42 for automatically comparing the measured absorption with a reference value and for automatically determining whether a teat 15*a* of a milking animal has been completely and appropriately cleaned or not in the teat cleaning process based on the comparison.

The reference value is preferably a value between an absorption which would be obtained if the teat cleaning cup 17' is empty and an absorption which would be obtained if a teat is contained within the teat cleaning cup 17' in an unfolded manner. Thus, by comparing the measured absorption with the reference value it can be determined whether the teat 15*a* is contained within the teat cleaning cup 17' in an unfolded manner or not, which in turn indicates whether the teat 15*a* has been completely and appropriately cleaned or not in the teat cleaning process prior to measuring the absorption.

The source of waves 41 and the sensor 42 may alternatively be arranged on top of or above the teat cleaning cup 17' to measure the absorption immediately above the teat cleaning cup 17'.

In one version the arrangement of FIG. 4 is arranged to automatically measure the teat related parameter in or adjacent to the teat cleaning cup 17' repeatedly during removal of the teat cleaning cup 17'. Hereby, if something is detected to be contained in the teat cleaning cup 17', the length of it can be determined and this measure can be used in order to determine whether it is a teat or not. For instance, if vacuum is applied to the teat cleaning cup 17', part of the udder of a milking animal (which is not a teat) may be sucked into the teat cleaning cup 17' and be cleaned in the teat cleaning process. The above repeated detection can be used to distinguish whether the sucked in part of the udder actually is a teat. Hereby, the number of correct teat detections can be increased.

It shall be appreciated that the source of waves 41 and sensor may be adapted for using other kinds of waves than microwaves, such as e.g. light, IR light, sonic, or ultrasonic waves.

Further, the arrangement may comprise a passive sensor to measure the presence of a teat in or above the teat cleaning cup at completion of a teat cleaning process or during the removal of the teat cleaning cup. In such instance, the source of waves may be dispensed with. The sensor may e.g. be a sensor for measuring pressure, light, or an electric parameter such as resistance, inductance, or capacitance.

Figure 5:
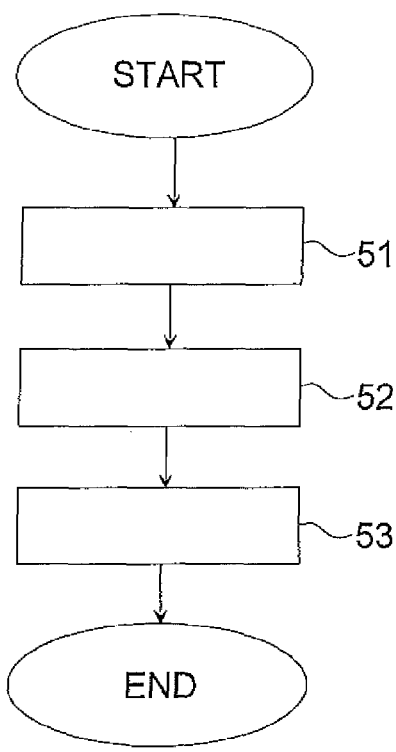
FIG. 5 is a flow scheme of a detecting method according to a yet further embodiment of the invention.

FIG. 5 is a flow scheme of a detecting method for a teat cleaning device including a teat cleaning cup, in which teats of milking animals are contained during cleaning thereof according to a yet further embodiment of the invention. According to the method, a teat related parameter in or adjacent to the teat cleaning cup is, in a step 51, automatically provided or measured at completion of a teat cleaning process. The measured teat related parameter is, in a step 52, automatically compared with a reference value. Finally, it is, in a step 53, automatically determined whether a teat of a milking animal has been completely and appropriately cleaned or not in the teat cleaning process based on the comparison. The method may be implemented by any of the arrangements disclosed above.

Figure 6:
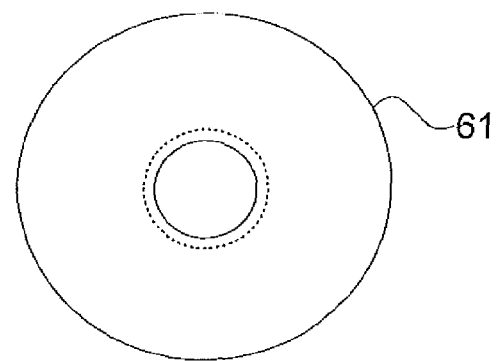
FIG. 6 illustrates a computer program product for carrying out the method of FIG. 5 when the product is run on a computer.

Further, a computer program product loadable into the internal memory of a computer is provided, wherein the computer program product comprises software code portions for carrying out the above method when the computer program product is run on the computer. FIG. 6 illustrates such a computer program product 61.

It shall be appreciated that various features of the different embodiments of the invention described above may be combined in yet further manners to reach yet further embodiments of the invention. In particular, the arrangement of the invention may be incorporated into virtually any kind of dairy system, which comprises a teat cleaning device provided with a teat cleaning cup and for the FIGS. 1-3 embodiment an arm for holding the teat cleaning cup.

The invention claimed is:

1. A detecting arrangement for a teat-cleaning device including a teat-cleaning cup, in which a teat of a milking animal is contained during cleaning thereof, said detecting arrangement comprising:
   a measuring device provided for automatically measuring a teat-related parameter reflecting a manner of attachment of the teat to the teat-cleaning cup, wherein the measuring is performed before completely removing said teat-cleaning cup from the teat and performed in a region including the teat-cleaning cup and a region adjacent the teat-cleaning cup; and a processing device operatively connected to the measuring device and provided for:
automatically comparing the measured teat-related parameter with a reference value; and
automatically determining whether the teat of the milking animal has been properly contained in the teat-cleaning cup during the teat-cleaning process based on said comparison.

2. The arrangement of claim 1, wherein the teat-related parameter further reflects at least one of the presence of the teat of the milking animal in or above the teat-cleaning cup or the position of the teat in relation to the teat-cleaning cup.

3. The arrangement of claim 1, wherein said measuring device comprises a three-dimensional vision system provided for recording at least one image of an area that includes an upper end of said teat-cleaning cup in a lower portion of the area, where the vision system records said at least one image during removal of the teat-cleaning cup and includes—an image processor provided for deducing said teat-related parameter from said at least one image.

4. The arrangement of claim 3, wherein said vision system a camera that has a two-dimensional array of pixels and provides for each of the pixels, a distance between the camera and an object point imaged.

5. The arrangement of claim 3, wherein said teat-related parameter is a position of the teat in a plane (xy) essentially orthogonal to a direction (z) of said removal of the teat-cleaning cup.

6. The arrangement of claim 5, wherein said position is a position of the teat relative to a position of said teat-cleaning cup in said plane (xy).

7. The arrangement of claim 3, wherein said vision system is mounted on a robot arm provided for carrying out the removal of said teat-cleaning cup.

8. The arrangement of claim 1, wherein the measuring device is mounted on a robot arm and wherein the teat-related parameter reflects a force required by the robot arm to remove said teat-cleaning cup.

9. The arrangement of claim 1, wherein said measuring device comprises:
a source of waves provided for transmitting waves towards an area within or above said teat-cleaning cup; and
a sensor provided for detecting waves from the source of waves.

10. The arrangement of claim 9, wherein said teat-related parameter reflects an absorption by the teat of the waves at a position between said wave source and said sensor.

11. The arrangement of claim 9, wherein said waves include microwaves.

12. The arrangement of claim 9, wherein said wave source and said sensor are mounted in the walls of said teat-cleaning cup.

13. The arrangement of claim 9, wherein said measuring device repeatedly measures the teat-related parameter in proximity to said teat-cleaning cup during removal of the teat-cleaning cup.

14. The arrangement of claim 1, wherein the teat-related parameter reflects a vacuum level in the teat-cleaning cup.

15. The arrangement of claim 1, wherein the processing device is (i) operatively connected to the teat-cleaning device and (ii) provided for automatically requesting said teat-cleaning device to perform a further teat-cleaning process of the teat if said processing device determines that the teat of the milking animal has not been properly contained in the teat-cleaning cup during the teat-cleaning process.

16. A milking system comprising the arrangement of claim 1.

17. A non-transitory computer program product for a detecting arrangement of a teat-cleaning device, the teat-cleaning device including a teat-cleaning cup in which teats of milking animals are contained during cleaning thereof, said computer program product storing instructions for performing a method, when executed by a processor, comprising:
automatically providing a teat-related parameter reflecting a manner of attachment of the teat to the teat-cleaning cup, wherein the teat-related parameter is measured before completely removing said teat-cleaning cup from the teat and measured in a region including the teat-cleaning cup and a region adjacent the teat-cleaning cup;
automatically comparing the measured teat-related parameter with a reference value; and
automatically determining whether the teat of the milking animal has been properly contained in the teat-cleaning cup during the teat-cleaning process based on said comparison.

18. The computer program product of claim 17, the method further including:
determining said measured teat-related parameter from at least one image of an area that includes an upper end of said teat-cleaning cup in a lower portion of the area, as recorded by a vision system during removal of the teat-cleaning cup.

19. The computer program product of claim 18, wherein said teat-related parameter reflects a position of the teat in a plane (xy) essentially orthogonal to a direction (z) of said removal of the teat-cleaning cup.

20. A detecting method for a teat-cleaning device including a teat-cleaning cup in which a teat of a milking animal is contained during cleaning thereof, the method comprising:
automatically providing teat-related parameter measured before completely removing said teat-cleaning cup from the teat at completion of a teat-cleaning process and measured in a region including the teat-cleaning cup and a region adjacent the teat-cleaning cup, wherein the teat-related parameter reflects a manner of attachment of the teat to the teat-cleaning cup;
automatically comparing, by a computer processor associated with the teat-cleaning device, the measured teat-related parameter ith a reference value; and
automatically determining whether the teat of the milking animal has been properly contained in the teat-cleaning cup during the teat-cleaning process based on said comparison.

21. The method of claim 20, wherein the teat-related parameter is related to at least one of the presence of a teat of a milking animal in or above the teat-cleaning cup or the position of the teat in relation to the teat-cleaning cup.

22. The method of claim 20, wherein the step of automatically providing comprises:
determining said measured teat-related parameter from at least one image of an area that includes an upper end of said teat-cleaning cup in a lower portion of the area, as recorded by a vision system during removal of the teat-cleaning cup.

23. The method of claim 22, wherein said teat-related parameter reflects a position of the teat in a plane (xy) essentially orthogonal to a direction (z) of said removal of the teat-cleaning cup.

24. A detecting method for a teat-cleaning device including a teat-cleaning cup in which a teat of a milking animal is contained during cleaning thereof, the method comprising:
- automatically measuring a teat-related parameter reflecting a manner of attachment of the teat to the teat-cleaning cup, wherein the measuring is performed before completely removing said teat-cleaning cup from the teat following a teat cleaning process;
- comparing, by a computer processor associated with the teat-cleaning device, the measured teat-related parameter with a reference value; and
- determining, based on the comparison, whether the teat of the milking animal has been contained in the teat-cleaning cup properly during the teat-cleaning process.

* * * * *